Dec. 10, 1957 F. K. FALZ 2,815,782
FEEDING MEANS FOR SLICING MACHINE
Filed Dec. 17, 1954 4 Sheets-Sheet 1
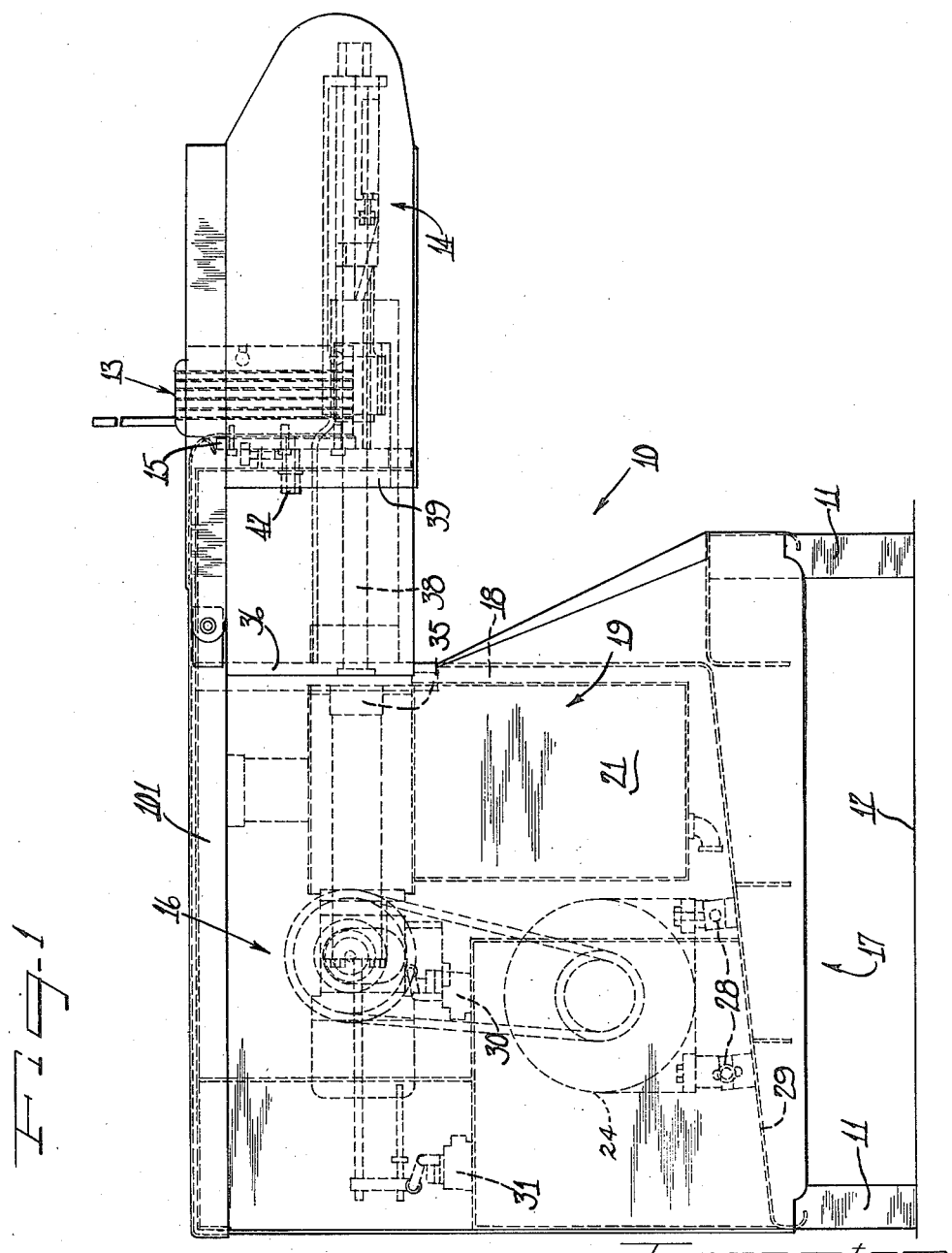
Inventor
Friederich K. Falz Dec. 10, 1957  F. K. FALZ  2,815,782
FEEDING MEANS FOR SLICING MACHINE
Filed Dec. 17, 1954  4 Sheets-Sheet 2
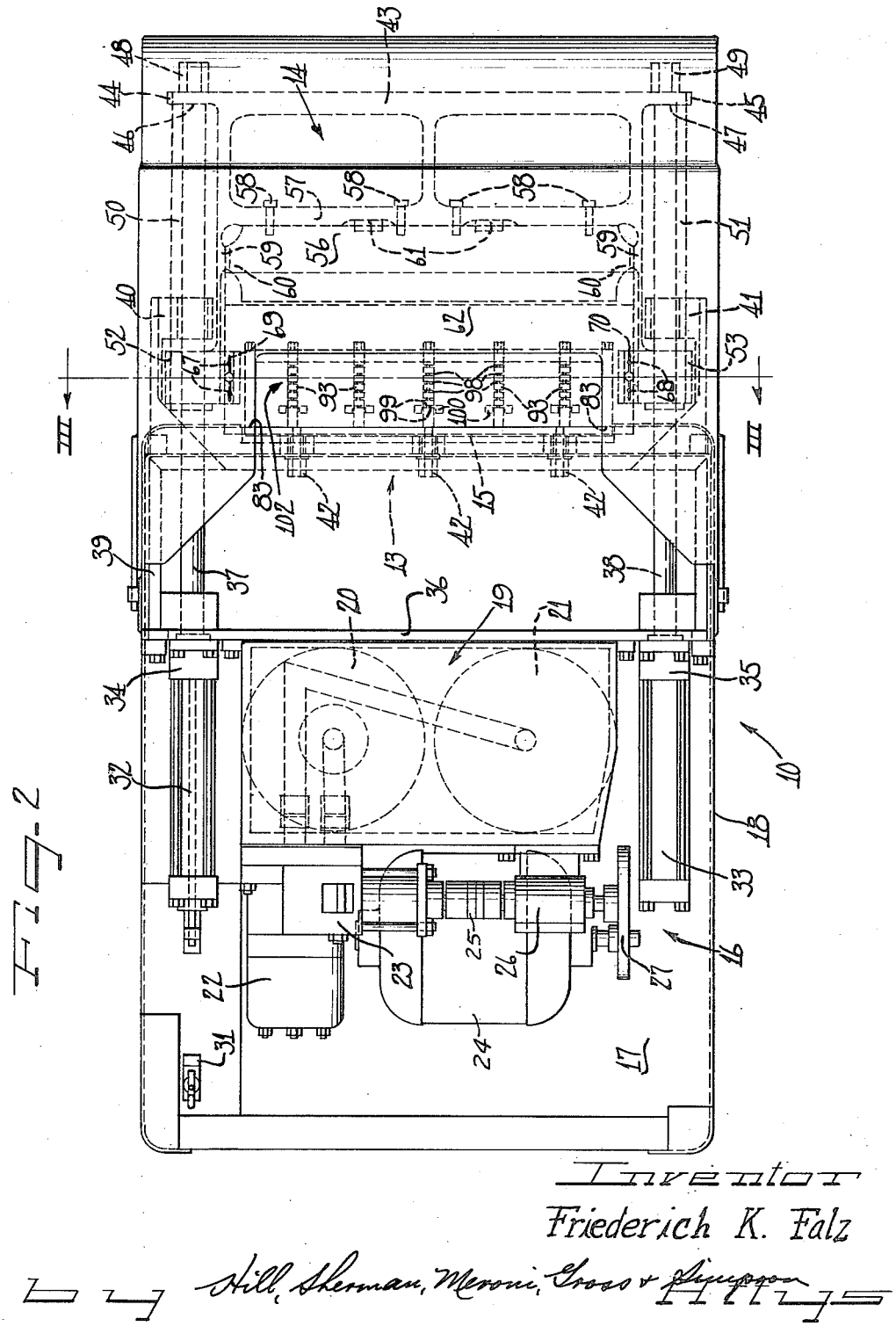
Inventor
Friederich K. Falz Dec. 10, 1957  F. K. FALZ  2,815,782
FEEDING MEANS FOR SLICING MACHINE
Filed Dec. 17, 1954  4 Sheets-Sheet 3
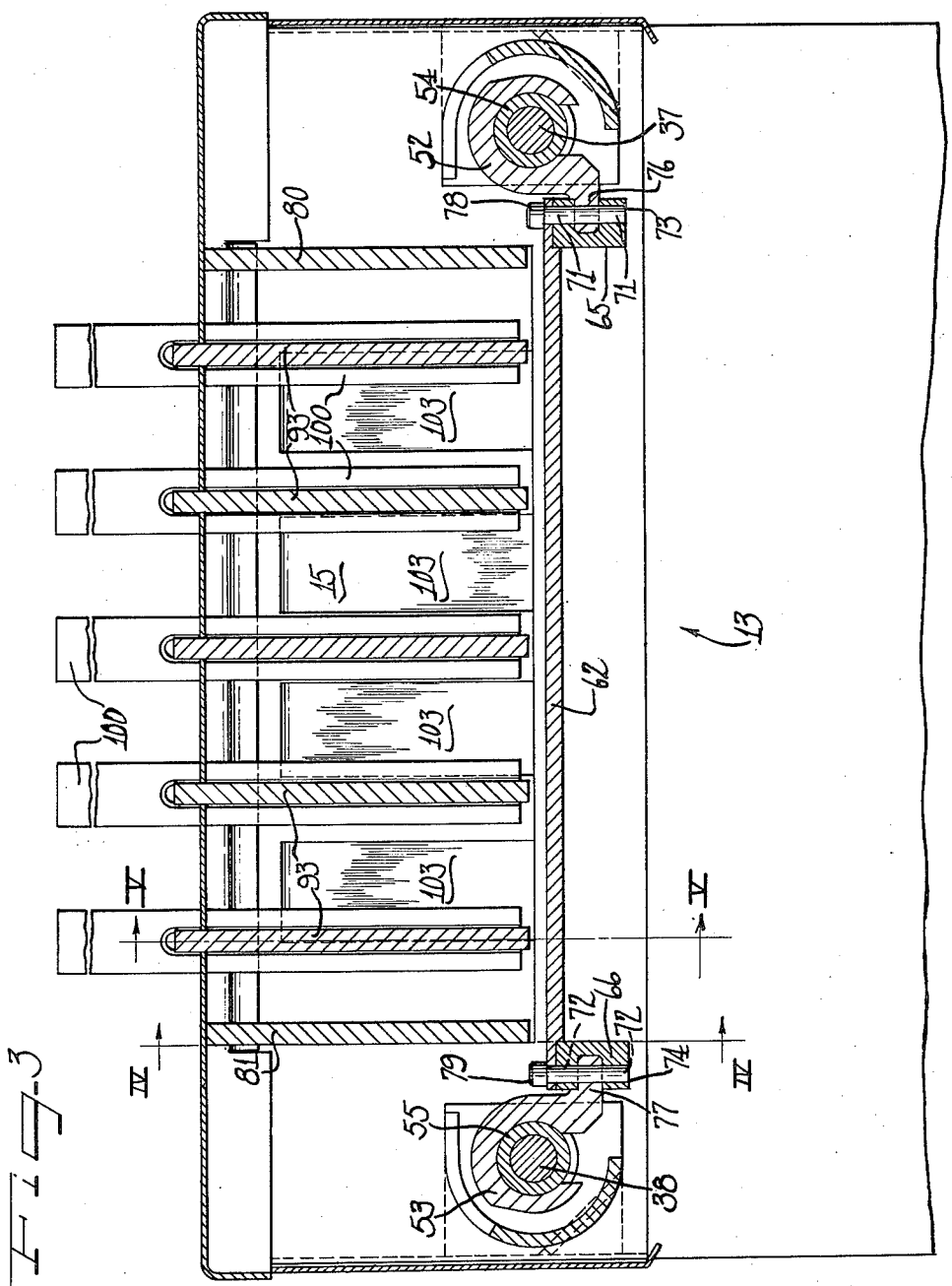
Inventor
Friederich K. Falz
by Hill, Sherman, Meroni, Gross & Simpson
Attys Dec. 10, 1957  F. K. FALZ  2,815,782
FEEDING MEANS FOR SLICING MACHINE
Filed Dec. 17, 1954  4 Sheets-Sheet 4
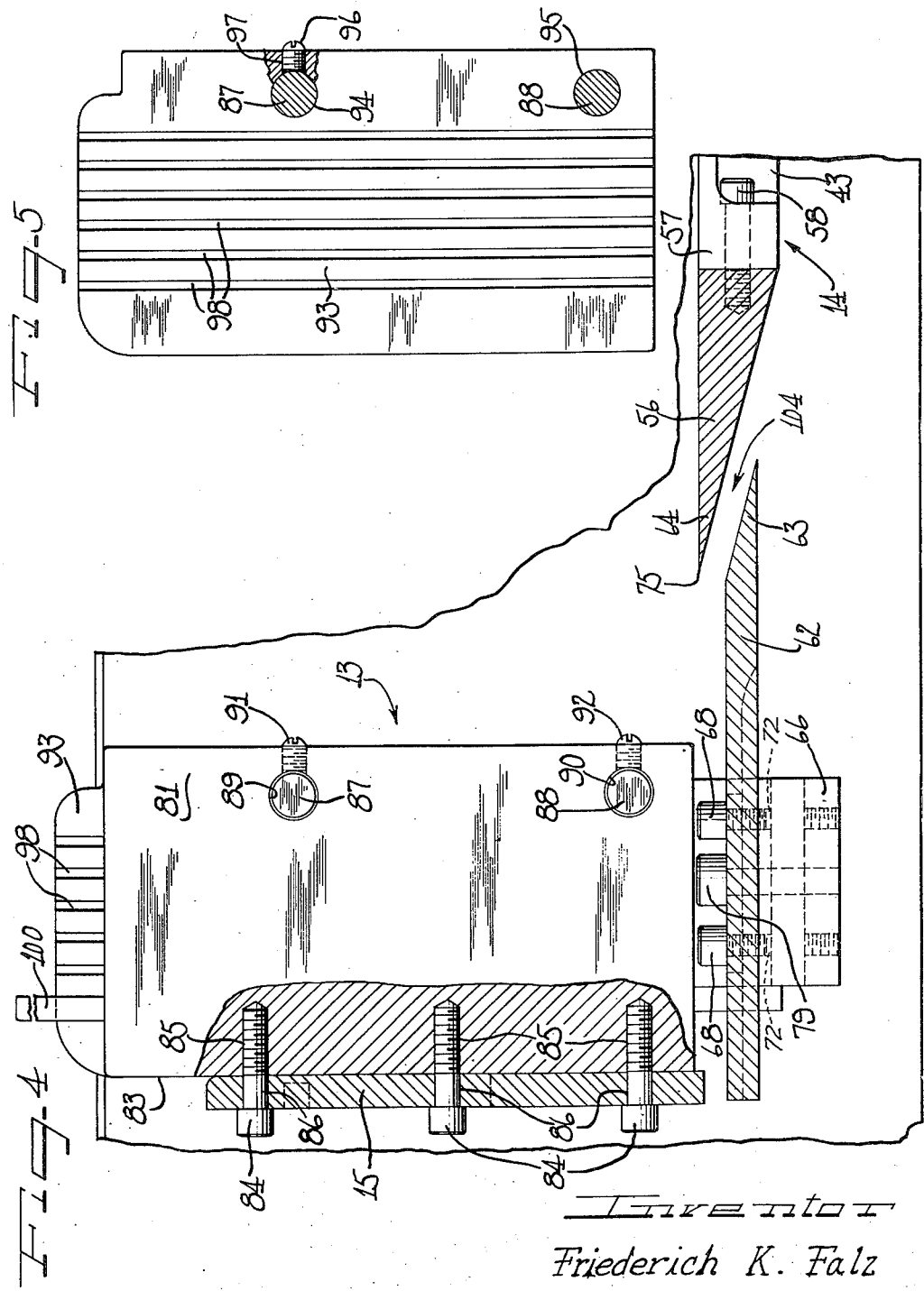
Inventor
Friederich K. Falz United States Patent Office 2,815,782
Patented Dec. 10, 1957

2,815,782

FEEDING MEANS FOR SLICING MACHINE

Friederich K. Falz, Kiel, Wis., assignor to H. G. Weber & Company, Inc., Kiel, Wis., a corporation of Wisconsin Application December 17, 1954, Serial No. 475,918

6 Claims. (Cl. 146—151)

The present invention relates to slicing mechanisms and more particularly relates to mechanism for slicing slab material such as frozen fish slabs into sticks by a reciprocating knife.

The slicing machine of this invention, however, is particularly adapted for such advantageous use as slicing fish sticks from fish slabs economically and efficiently and effecting great savings over previously known and used methods and apparatus for effecting the same end result, since slicing in accordance with the present invention eliminates fish sawdust which is completely worthless and which often amounted to as high as 12½% of the fish slabs. All previously known used methods for making fish sticks from fish slabs utilized saws such as banks of saws or multiple saws. In addition, many of these saw devices were not automatic feeding and those which were capable of effecting automatic feeding of the fish slabs to the saw blades were complex and expensive devices. Through operation of the present invention, however, these difficulties are obviated and the fish slabs may be fed into the slicing machine economically and efficiently through gravity feeding techniques.

Another outstanding advantage of the present invention lies in the adjustable backing and supporting assembly for the fish slabs to be sliced. This assembly is substantially completely adjustable for various sizes of fish slabs including variations in the width and thickness as well as in the height thereof, and the mechanism further provides means for adjusting the thickness of the sticks cut from the slabs.

Included in the backing and supporting assembly for the slabs are guide plates which are adjustable to different widths of slabs in addition to being variously grooved to accept various width fork plates at various positions thereon to properly support and back various thickness slabs.

While the dead knife structure is adjustable with respect to the live knife structure for controlling efficiency of cutting of the slabs by the cooperation of the live knife and the dead knife structures, the thickness of the slice taken from the slabs by this slicing cooperation of the knives may be adjusted by adjustably positioning the supporting plate which cooperates with the live knife and is reciprocable therewith.

In addition to the foregoing, numerous other parts of the assembly and the mechanism are adjustable and positionable for fine, accurate and economical operation of the device with each part being operable to be locked in place when adjusted for continuous automatic gravity feed operation of the mechanism. Thus, it will be seen that the mechanism of the present invention is one of general utility even though it is described herein in an environment where it will enjoy particularly advantageous use.

It is, therefore, an important object and feature of the present invention to provide a new and improved slicing machine with an improved adjustable work or slab holding and guiding assembly which is substantially universally adjustable and which permits automatic feeding of the work or slab into the mechanism for slicing thereof.

Another important object and feature of the present invention is to provide a slicing mechanism with an improved work holding and guiding assembly adjustably operable for holding and guiding work slabs of varying widths and thicknesses and to permit slicing in various sized slices thereof.

Yet another object and feature of the present invention is to provide a slicing machine having a reciprocably operated and hydraulically actuated live knife structure with a new and improved live knife blade for the live knife structure, the improved blade also being replaceable.

Still another object of the present invention is to provide a hydraulically actuated reciprocably operated slicing mechanism with new and improved work guide and holding means and new and improved work-supporting plate structure which cooperates with the live knife structure for improved slicing.

Still other objects, features and advantages of the present invention will become readily apparent from the following detailed description of the present invention and an embodiment thereof, from the claims, and from the accompanying drawings in which each and every detail shown is fully and completely disclosed as a part of this specification, in which like reference numerals refer to like parts, and in which:

Figure 1 is an elevational view of a slicing machine having structure therein incorporating the principles of this invention;

Figure 2 is a plan view of the machine of Figure 1 with the cover of the drive and control portion of the mechanism removed to better illustrate those portions of the machine;

Figure 3 is a sectional view of the guide and work holding assembly viewed as taken substantially along the line III—III of Figure 2;

Figure 4 is a broken sectional view of the guide and work holding assembly viewed as taken substantially along the line IV—IV of Figure 3; and Figure 5 is an elevational view of one of the guide plates of the work guiding and holding assembly viewed in the assembly and substantially as taken along the line V—V of Figure 3.

As shown on the drawings:

In Figures 1 and 2, the complete slicing machine 10 is illustrated as the same is completely assembled and standing on its legs 11 on the floor 12. This slicing machine is, as pointed out above, one of general utility but enjoys particularly advantageous utilization in connection with slicing fish slabs into fish sticks or the like. For this purpose the machine is equipped with a hopper work holding and guiding assembly 13 which holds the work for slicing by the live knife assembly 14 cooperatively arranged with a dead knife 15. The live knife assembly 14 is arranged to be reciprocably operated by a hydraulic actuating and control system 16 in the drive and control region 17 of the housing 18.

In connection herewith, however, it should be specifically noted that the drive and control system 16 of the slicing machine 10 has a hydraulic fluid tank structure 19 which includes a pair of interconnected tanks 20 and 21 through and between which oil flows as the same is controlled by a valve assembly 22 and is pumped by a pump structure 23 driven by a motor 24 through a flexible coupling 25, a countershaft 26, and a belt and pulley arrangement 27. The motor is mounted on adjustable legs 28 which are secured to the floor plate 29 of the drive and control section of the slicing machine 10. Through proper manipulation of the valve mechanism and control thereof by such means as adjustably positionable spaced limit switches 30 and 31, double acting hydraulic pistoncylinder assemblies 32 and 33 may be actuated for reciprocation of such other parts of the mechanism as the live knife 14. For this purpose, the rod ends 34 and 35, respectively, of the cylinders of the cylinder-piston assemblies 32 and 33 are fixedly secured to a partition wall 36 at the rearward end of the drive and control section and the piston rods 37 and 38 extend through apertures in the wall 36 for reciprocation as they are hydraulically actuated.

Also joined to the partition wall is a support framework 39 carrying rearwardly extending bearings 40 and 41 disposed to support the elongated piston rods 37 and 38, respectively, in the vicinity of the work guide and holding assembly 13. This framework 39 further carries adjusting and securing elements 42—42 for mounting, carrying and adjustably positioning the dead knife 15 so that the dead knife may be properly adjusted for accurate cooperation with the live knife assembly 14 when the machine is utilized to slice work pieces such as frozen fish slabs and the like.

The live knife assembly 14 is supported on the rearward free ends of the piston rods 37 and 38 by a support knife carrier framework 43 which may be of cast or welded construction and which includes a pair of laterally extending portions 44 and 45 which are apertured to fit over threaded ends of the piston rods 37 and 38, respectively, and abut shoulders 46 and 47 thereon and be securely fixed in place by nuts 48 and 49 on the threaded ends of the piston rods. Forwardly of the lateral extensions 44 and 45, there are extending portions 50 and 51 of the knife carrier 43 which extend forwardly beyond the bearings 40 and 41 to second supporting points 52 and 53 which are substantially hook-shaped, as illustrated in Figure 3, and are slidable over the piston rods 37 and 38 together with tightening shims 54 and 55 between the inner circumferential faces of the hooks 52 and 53 and the piston rods 37 and 38. This structure thus securely supports the live knife blade 56 on the piston rods 37 and 38 for reciprocation together therewith.

The live knife blade 56 has a substantially triangular cross-sectional configuration, as illustrated in Figure 4, and is secured against a backing bar 57 on the carrier 43. This is accomplished through the utilization of cap or machine screws 58—58 extending through the interface between the bar 57 and the butt end of the live knife blade 56 and into the live knife blade. In addition, grooved ears 59—59 extending laterally inwardly from the extension portions 50 and 51 of the carrier 43 interlock with laterally outward extensions 60—60 on the lateral edges of the live knife blade 56 and locating bars 61—61 on the backing bar 57 properly locate and position the live knife blade 56 in aid of the above described structure.

Cooperatively arranged with the live knife structure 14 for reciprocation together therewith on the piston rods 57 and 38 supported by bearings 40 and 41, is a work supporting and conveying plate 62 which is adjustably supported on the live knife carrier hook ends 52 and 53 and which has a tapered rearward edge 63 cooperatively corresponding with the tapered leading edge region 64 of the live knife 56 (note Figure 4). This plate 62 bottomingly supports the work pieces or slabs and conveys the sliced sticks or cut away portions of the slabs from the remainder of the work and from the knife unit to drop the same onto a collecting assembly as desired beneath the slicing machine as hereinafter described in detail in conjunction with the operation of the device.

For adjustably mounting the plate 62, the plate has adjustably secured thereto a pair of carrying blocks 65 and 66 (Figure 3) which are substantially rectangular U-shaped and fixed to the plate 62 by pairs of cap or machine screws 67—67 and 68—68 extending through slots 69 and 70 in the plate 62 at opposite lateral sides thereof, and into threaded apertures 71 and 72 in the arms of the U blocks 65 and 66. Loosening of the screws 67 and 68 permits forward and rearward adjustment of the plate 62 with respect to the live knife blade 56 for adjustably aligning the same and adjustably positioning the work bottoming carrying plate 62 for proper clearance between its tapered rearward edge and the tapered forward edge of the live knife blade so that the cut stick portions from the work pieces may slide therebetween and drop to the collecting or carrying mechanism beneath the machine (not illustrated).

Further adjustment of the work bottoming plate, for the purposes of effecting slicing control for varying thickness slices is also effected by disconnecting the U-shaped blocks 65 and 66 from the plate 62 and reversing the same since opposed arms on the blocks are of different thicknesses; that is, since the grooves 73 and 74 in the blocks 65 and 66, respectively, are vertically eccentrically disposed. This reversal of the blocks 65 and 66 by 180° rotation of each thereof, and resecuring the same to the plate 62 will vary the height of the plate 62 with respect to the bottom edge of the dead knife 15 and with respect to the top or cutting edge 75 of the live knife blade 56 since these grooves 73 and 74 interfit, are supported on and are carried by laterally inwardly projecting ears 76 and 77 on the hook portions 52 and 53 of the live knife carrier 43. The bottoming plate 62 with the U blocks 65 and 66 secured thereto are anchored on these ears 76 and 77 on the hook portions 52 and 53 of the live knife carrier 43 by a pair of pins 78 and 79 extending through the slots 69 and 70 in the plate 62 and through appropriate vertical apertures in the blocks 65 and 66 and further appropriate apertures vertically through the ears 76 and 77 on the hooks 52 and 53.

In this manner, the bottoming plate 62 is secured to the carrier 43 in a manner permitting convenient adjustment of the height of the bottoming plate with respect to the cutting edge 75 of the live knife 56 and with respect to the dead knife 15. Also, this mechanism provides a convenient locking of the bottoming plate 62 to the carrier 43 for reciprocation together with the live knife assembly 14.

While the bottoming plate 62 is operative to support the workpieces such as frozen slabs of fish filets or other desired workpieces, the workpieces themselves are held in the guide assembly 13 which is adjustable for various sizes of workpieces independent of the height or length of the workpieces. This guide assembly includes a pair of fixed bracket plates 80 and 81 which are secured along the forward edge 83—83 thereof to the rearward face of the dead knife 15 at the lateral extremities of the dead knife, note Figures 2 and 4. Cap or machine screws 84—84 are threaded into threaded recesses 85—85 in the forward edge of each of the plates 80 and 81 and extend through appropriate apertures 86 in the dead knife 15 for fixedly securing these bracket plates 80 and 81 thereto. Mounting bars or rods 87 and 88 extend laterally across the guide and support assembly and through appropriate apertures 89 and 90 in the plates 80 and 81 and are locked in position by set screws 91 and 92 in each of the plates extending through threaded apertures in the rearward edge of the plates 80 and 81. These mounting bars or rods 87 and 88 carry a plurality of guide plates 93—93 (shown in detail in Figure 5) by extending through appropriate apertures 94 and 95 in the guide plates and aligned with the apertures 89 and 90 in the bracket plates 80 and 81. These guide plates 93 are dimensioned substantially the same as the bracket plates 80 and 81 so that their forward edge may lie substantially flush with the rearward face of the dead knife 15. In the embodiment shown, the guide plates may be somewhat taller than the bracket plates but this dimensioning is not critical. It is important, however, that the apertures 94 and 95 in the guide plates be aligned with the apertures 89 and 90 in the bracket plates so that the bars 87 and 88 will properly interfit with the several plates and thus support the guide plates properly.

The several guide plates 93 are movable laterally across the slicing machine for adjustment to various widths of workpieces and when adjusted may be locked in position by such means as a set screw 96 threaded through an appropriate aperture 97 in the rearward edge of each of the guide plates 93 so that the set screw will lock against one of the bars 87 or 88. As shown in Figure 5, the set screw 96 will lock against the rod 87.

The opposite lateral faces of each of the guide plates 93 has a plurality of oppositely aligned backing plate grooves 98—98 in each thereof for interfitting cooperation with laterally inwardly extending flanges 99—99 on the inner edges of the arms and the bight portion of backing plates 100 slidably engaging, in a tongue and groove manner, the guide plates 93—93. A backing plate 100 is mounted on each of the guide plates 93 and takes the form of an elongated U-shaped member for tongue and groove interfitting with the grooves in the guide plates. By providing a plurality of grooves in the guide plates these backing plates may be adjustably spaced from the rearward face of the dead knife so as to accommodate various thicknesses of workpieces which will then gravitationally feed through the feed slots defined by adjacent guide plates with cooperating backing plates and the rearward face of the dead knife 15.

In operation, the fish slabs or other workpieces may be stacked on the table top 101 of the cabinet of the machine and thence fed through the hopper space 102 where the guide and support mechanism 13 will accept the same and gravitationally automatically feed the workpieces downwardly toward the bottoming plate 62 as the bottoming plate and live knife reciprocate to cut fish sticks from the fish slabs. To improve the cutting cooperation between the dead knife 15 and the live knife cutter 56, the dead knife may be provided with a plurality of recesses 103 which prevent sticking and jamming of the work. As the fish sticks are cut from the workpieces they will be automatically dropped through the space 104 between the live knife tapered portion and the bottoming plate tapered portion, 64 and 63, respectively, which is adjusted to be slightly larger than the space between the upper face of the carrying plate 62 and the lower edge of the dead knife 15.

On each return stroke of the knife to a position such as that shown in Figure 4, the fish slabs will drop to the bottoming plate so that upon each forward cutting stroke, to the left in Figure 4, additional fish sticks will be cut from the workpieces.

It will be understood, of course, that numerous variations and modifications may be made in slicing apparatus without departing from the true spirit and scope of the novel concepts and principles of this invention and I, therefore, intend to cover such modifications and variations.

I claim as my invention:

1. In a slicing machine, a dead knife, a live knife blade mounted for relative reciprocation toward and away from said dead knife, a pair of bracket plates secured to said dead knife, support bars carried by said plates, and a plurality of guide plates carried on said bars and adjustably positionable thereon.

2. In a slicing machine, a dead knife, a live knife blade mounted for relative reciprocation toward and away from said dead knife, a pair of bracket plates secured to said dead knife, support bars carried by said plates, a plurality of guide plates carried on said bars, said guide plates each having a pair of opposed aligned grooves on opposite sides thereof, and work backing members carried on said guide plates and interfitting with the grooves in the guide plates.

3. In a slicing machine, a dead knife, a live knife blade mounted for relative reciprocation toward and away from said dead knife, a pair of bracket plates secured to said dead knife, support bars secured to said plates, a plurality of guide plates carried on said bars, said guide plates each having a plurality of pairs of opposed aligned grooves on opposite sides thereof, and work backing members carried on said guide plates each interfitting with a pair of the grooves in said guide plates.

4. In a slicing machine, a dead knife, a live knife blade mounted for relative reciprocation toward and away from said dead knife, a pair of bracket plates secured to said dead knife, support bars carried by said plates, a plurality of guide plates carried on said bars, said guide plates each having a pair of opposed aligned grooves on opposite sides thereof, and work backing members carried on said guide plates and interfitting with the grooves in the guide plates, and means to adjustably position the guide plates on the supporting bars.

5. In a slicing machine, a dead knife, a live knife blade mounted for relative reciprocation toward and away from said dead knife, a pair of bracket plates secured to said dead knife, support bars carried by said plates, a plurality of guide plates carried on said bars, and work backing members carried on said guide plates.

6. In a slicing machine, a dead knife, a live knife blade mounted for relative reciprocation toward and away from said dead knife, a pair of bracket plates secured to said dead knife, support bars carried by said plates, a plurality of guide plates carried on said bars, and work backing members carried on said guide plates, said guide plates being adjustably positionable on said support bars and said work backing members being adjustably positionable on said guide plates.

References Cited in the file of this patent

UNITED STATES PATENTS 2,088,298    Love _____ July 27, 1937

FOREIGN PATENTS 696,745    France _____ Oct. 20, 1930
387,402    Great Britain _____ Feb. 9, 1933